United States Patent [19]

Thompson, deceased

[11] Patent Number: 4,484,368
[45] Date of Patent: Nov. 27, 1984

[54] FISHERMAN'S TOOL FOR CUTTING LINE AND CLEANING HOOKS

[75] Inventor: Harry C. Thompson, deceased, late of Elgin, Ill., by Sally L. Jacobsen, executor

[73] Assignee: D. H. Thompson Co., Elgin, Ill.

[21] Appl. No.: 423,824

[22] Filed: Sep. 27, 1982

[51] Int. Cl.³ .............................................. B25F 1/00
[52] U.S. Cl. .......................................... 7/106; 30/135; 7/900
[58] Field of Search ............................ 7/106, 169, 900; 30/135, 234, 253; 81/43

[56] References Cited

U.S. PATENT DOCUMENTS

| | | | |
|---|---|---|---|
| 53,260 | 4/1919 | Von Tobel | 7/169 |
| 3,754,290 | 8/1973 | Nicholson | 81/43 |
| 4,144,605 | 3/1979 | Eberhardt | 7/106 |

Primary Examiner—Roscoe V. Parker

[57] ABSTRACT

A fisherman's tool for cutting line and cleaning hooks that includes a pair of adjacent elongated spring members having ends curved generally in the same direction, with a cutting edge on one and line receiving recesses adjacent the end of the other so that when squeezed together the cutting edge wipes across the recesses severing line positioned therein. A hook eye cleaning point is formed integrally on the end of one of the spring members and it is rotated in the hook eye to clean paint, leader or line from the eye.

16 Claims, 8 Drawing Figures

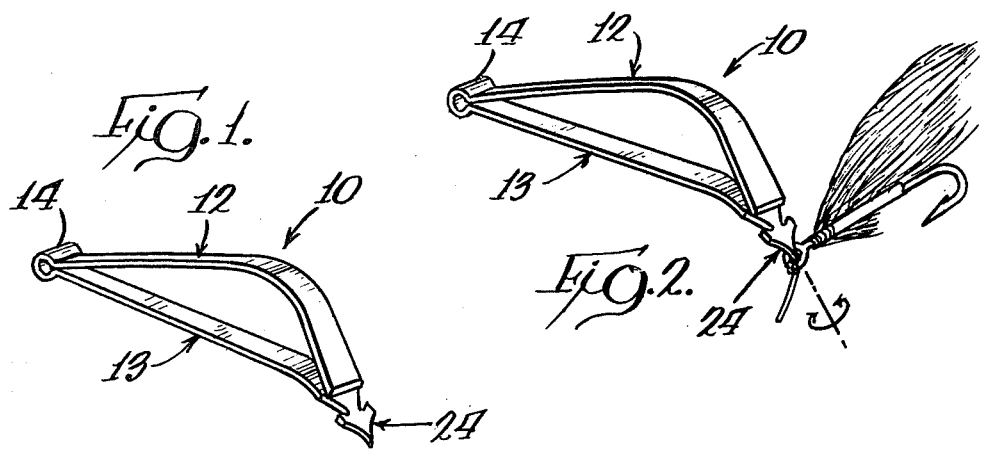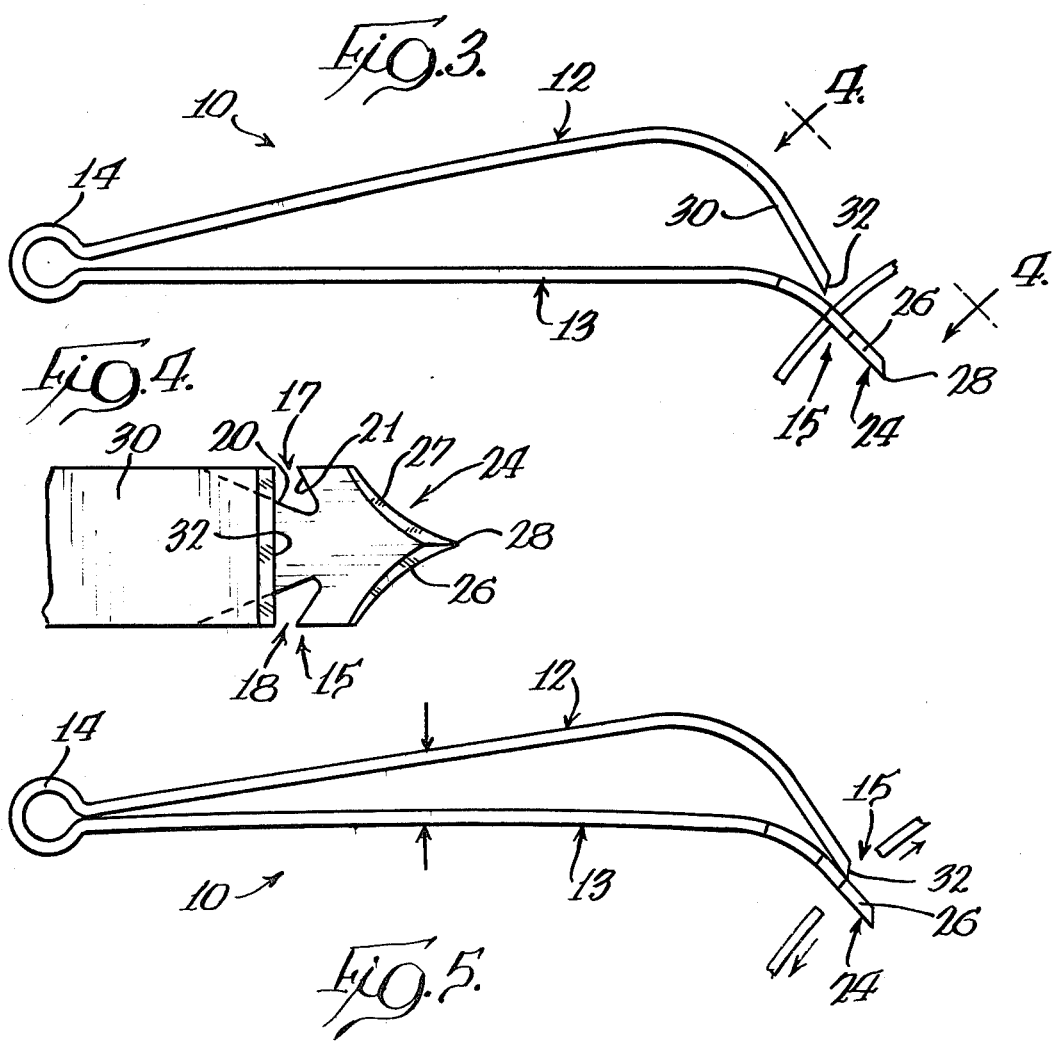

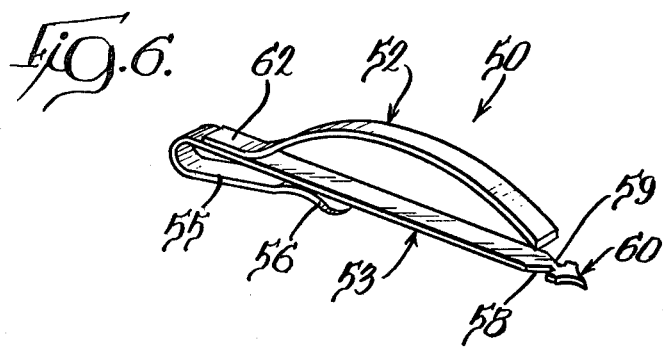
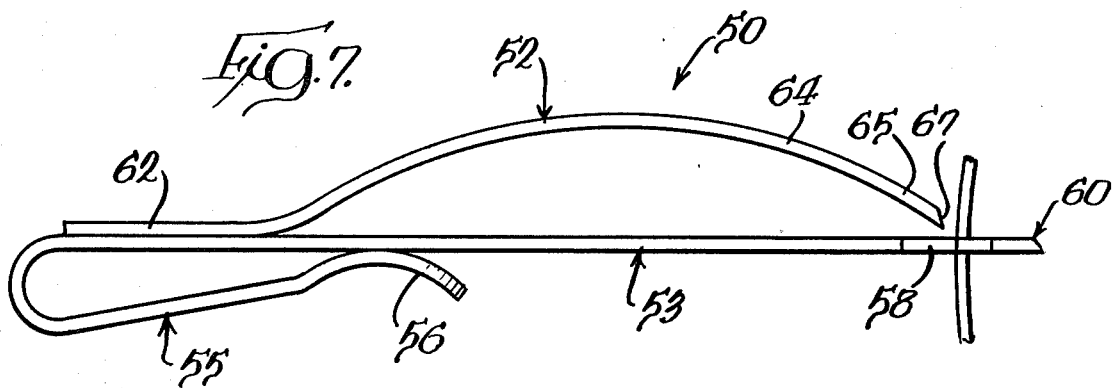
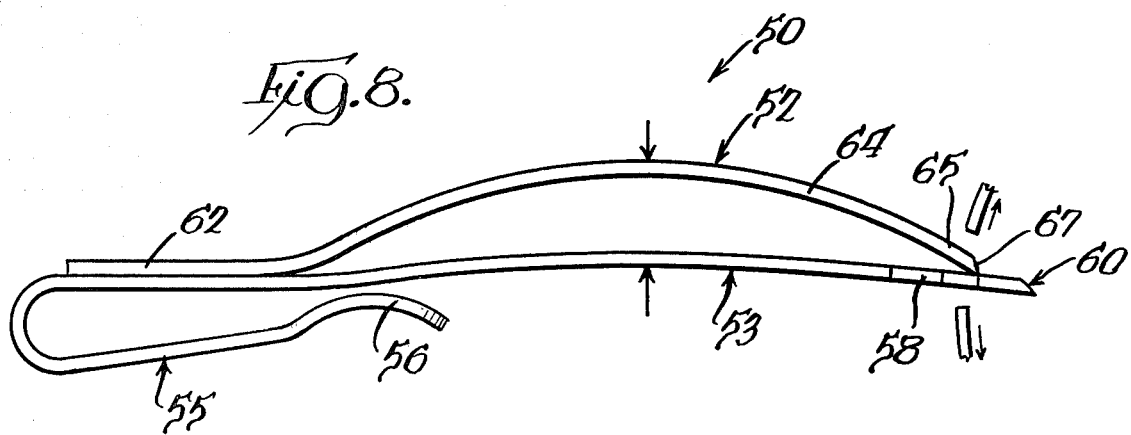

FISHERMAN'S TOOL FOR CUTTING LINE AND CLEANING HOOKS

BACKGROUND OF THE INVENTION

Instead of purchasing commercially manufactured flies and jigs, many fisherman today are making their own flies and jigs and in fact fly tying is an avocation or hobby identifiable apart from the actual fishing activity. To assist this fly tying hobbiest there are a variety of commercially available products usable in the fly tying process such as vises, fly clippings catching containers and various specially designed pliers and line knot tying devices. With the hook held in the vise, the various artificial fly material strands are attached to the hook by thread material to artfully form a multi-colored fly that when jerked over the surface of water simulates various insects.

Sometimes the fly tier will apply paint or cement to the completed fly, particularly when making a jig, which is similar to a fly with the addition of an enlarged head adjacent the hook eye. This paint or cement frequently enters the hook eye and after setting prevents the free entry of the line or leader in the eye and thus requires cleaning. Fly hooks are quite small and the inside diameter of their hook eyes is quite small, frequently less than 1/32 of an inch. This makes cleaning the eye with common tools quite difficult. Even small pocket knives have rather blunt nosed ends that do not do an adequate job of cleaning these small hook eyes.

When changing flies stream side or when removing flies from the line prior to going home the fisherman cuts and trims the leader and line. When removing the fly from the line or leader, the leader is severed and the eye knot must be cut away from the hook eye. The leader or line is usually severed with a knife, but a straight bladed knife such as found in pocket knives or paring knives or even small hunting knives requires one hand for holding the knife and the other for tensioning the line or leader, which is somewhat cumbersome when the fisherman is trying to hold the fly and the line and sometimes even the fly rod itself all at the same time. Moreover, the usual blunt blade ends on these knives make it difficult to cut the knot from the small hook eye.

It is a primary object of the present invention to ameliorate the problems noted above in fly tying and fly fishing and provide a combined fishing tool which will both cut line and leader and clean small hook eyes.

SUMMARY OF THE PRESENT INVENTION

In accordance with the present invention, a fisherman's tool is provided for both cutting or trimming leader and line and cleaning paint, cement or line from small hook eyes. The tool is very simple and easy to manufacture and includes a pair of flat spring members connected together at one end with one having a pair of line receiving recesses adjacent its free end and the other having its free end curved toward the free end of the other and ground to a cutting edge so that when the spring members are squeezed together by the fisherman, the cutting edge will wipe across the top of the other spring member over the recesses severing line positioned in those recesses.

The spring member that has the recesses near its free end also has a "V" shaped point formed and ground on its distal end having concave side edges that define very closely spaced cutting edges that easily fit within small hook eyelets to clean paint, cement and old line or leader from the eyelet.

In the preferred embodiment of the present invention, the entire tool is a one-piece heat treated low carbon or stainless steel having a resulting hardness in the range of 38 to 40 in the Rockwell C range. An exemplary low carbon steel (prior to heat treating) is 1050 and an exemplary suitable stainless steel is stainless 18-8. The tool is formed from a steel strip approximately 6¼" in length, 0.250" in width and approximately 0.020 to 0.025" thick. This steel strip is bent over upon itself by suitable forming machinery after both ends of the strip have been bent into gentle curves. The spring blade having the recesses is curved approximately 60 degrees from its own plane while the blade having the cutting edge is curved approximately 85 degrees out of its own plane toward the curved end of the other blade. The result of this geometry with the blades having an included angle of 15 degrees, and with the blade ends having an included angle of about 10 degrees, is excellent shearing action as the cutting edge on one blade wipes across the top surface of the other blade over the line receiving recesses. As the blades are squeezed together during cutting of leader or line in one of the recesses and as the upper blade begins sliding forwardly on the bottom blade, the bottom blade bends slightly downwardly and the top blade bend slightly upwardly approximately the same amount so that the blades maintain this 10 degree included angle relationship throughout cutting to achieve very excellent and consistent cutting action.

The line receiving recesses in the lower blade are generally "V" shaped and formed in the opposite sides of the blade near its free end. They are canted forwardly so that the line can be easily held in the recesses by slight rearward pressure on the tool. The cutting edge on the other or upper spring blade is ground at about a 60 degree angle forming a straight cutting edge parallel to the top surface of the lower blade to provide good wiping action across both of the line receiving recesses. The concave side edges of the point are also ground after forming to provide very sharp cutting edges to fit in and easily clean out even small hook eyes.

The hook eye cleaner point can be used during the fly tying procedure to easily clean paint and cement from the hook eye, and it can also be used at stream side to cut away line or leader material from the hook eye itself. This is accomplished by inserting blade point directly into the eye and briskly rotating the tool until the eye is free from any line or foreign material.

The cutter can be used at stream side, or really anywhere, to cut and trim line and leader both in taking off flies and attaching new ones.

It is readily seen that this one-piece combined line or leader cutter and hook cleaner may be manufactured at a fraction of the cost of conventionally known pocket knives, small hunting knives and even scissors, while doing these designated tasks in a superior manner.

According to another embodiment of the present invention, the lower blade element carrying the line receiving recesses is straight rather than curved and it is formed integrally with the spring clip to permit the tool to be clipped over part of the fisherman's clothing and easily carried about.

BRIEF DESCRIPTION OF THE DRAWINGS

FIG. 1 is a perspective view of a preferred embodiment of the present fisherman's tool for cutting line and cleaning hooks;

FIG. 2 is a perspective view of the fisherman's tool for cutting line and cleaning hooks, shown in FIG. 1 with its point being rotated in a fly hook eye, cutting a knot from the eye;

FIG. 3 is an enlarged side view of the fisherman's tool for cutting line and cleaning hooks shown in FIG. 1, in its relaxed state with line positioned in one of the line holding recesses in the bottom blade;

FIG. 4 is an enlarged fragmentary view taken generally along line 4—4 of FIG. 3;

FIG. 5 is a side view of the fisherman's tool illustrated in FIG. 3 with the upper and lower blades compressed cutting the line in one of the holding recesses;

FIG. 6 is a perspective view of another embodiment of the present fisherman's tool for cutting line and cleaning hooks;

FIG. 7 is an enlarged side view of the fisherman's tool illustrated in FIG. 6 in its relaxed position; and FIG. 8 is a side view of the fisherman's tool illustrated in FIG. 7 with the upper and lower blades compressed cutting line in one of the holding recesses.

DETAILED DESCRIPTION OF THE PREFERRED EMBODIMENTS

Referring to the drawings and particularly FIGS. 1 to 5, a preferred embodiment of the present fisherman's tool for cutting line and cleaning hooks is illustrated and generally designated 10, and is seen to be constructed of a one-piece metal strip that may be either a heat treated low carbon steel, such as 1050, or a suitable stainless steel such as stainless 18-8. The carbon steel is preferably heat treated 38 to 40 Rockwell C.

Tool 10 is formed from a metal strip approximately ¼" in width, 6¼" in length and 0.020 to 0.025" thick. With this geometry and suitable heat treating or inherent flexibility, the entire tool is flexible and has significant spring characteristics.

The lower blade member 13 is slightly shorter than the upper blade member (see FIG. 5) and has a downwardly curved free end 15 that lies in a plane rotated clockwise approximately 30 degrees with respect to a horizontal plane extending through the main portion of the lower blade element 13. Blade end 15, as seen in FIG. 3, has a pair of line holding recesses 17 and 18 that are generally "V" shaped in configuration and formed by forwardly converging side walls 20 and 21. The forwardly converging direction of side walls 20 and 21 assures that the line or leader will be held in the recess with a slight rearward pressure on the tool 10 by the fisherman, and also during cutting the cutter itself forces the line deeper into the recess.

The free end 15 also has a pointed cutter 24 ground at its distal end. Cutter 24 is defined by concave forwardly converging cutting edges 26 and 27 that are ground to a back angle defining sharp curved cutting edges. The concave configuration of cutting edges 26 and 27 results in the cutting edges being positioned more closely together near point 28 so that the cutting point 24 easily fits in and through even small hook eyes.

The upper spring blade element 12 extends upwardly from the lower spring blade element 13 (when blade element 13 is in a horizontal position as shown in FIG. 3) at an angle of approximately 15 degrees, and the free end 30 of the blade 12 is bent downwardly toward lower blade end 15 and lies in a plane rotated counterclockwise approximately 20 degrees from a vertical plane perpendicular to the plane of FIG. 3. This geometry results in the blade ends 15 and 30 having an interferring included angle of approximately 10 degrees to assure intimate sliding contact therebetween as the blade elements are compressed or squeezed together.

The upper blade end 30 has a straight cutting edge 32 ground on the extreme end thereof.

During cutting, the fisherman inserts his line or leader into one of the recesses 17 and 18, tensions the line slightly toward the bottom of the selected recess and with his thumb and forefinger squeezes the blade elements 12 and 13 together causing the cutting edge 32 to slide tightly across the upper surface of the lower blade end 15 across the recesses 17 and 18 driving the line to the bottom of the selected recess and then cleanly cutting the line or leader. As the cutting edge 32 engages and begins sliding down the lower blade end 15, the lower blade bends downwardly slightly to its position shown in FIG. 5 and the upper blade end 30 bends upwardly slightly approximately the same amount so that the same interferring angle of approximately 10 degrees is maintained throughout cutting to achieve very excellent cutting action.

The pointed cutter 24 is used to clean paint and cement as well as line knots from the hook eye by inserting the point 28 into the eye and briskly rotating it until the eye is clean.

Another embodiment of the present fisherman's tool is illustrated in FIGS. 6 to 8 and it is generally designated 50 therein, and is seen to include an upper blade element 52 and a lower blade element 53 the latter having an integrally formed clip 5. In this embodiment the upper blade element is formed separately from the lower blade element and welded thereto at 56.

The upper and lower blade elements 52 and 53 are constructed of the same materials recommended for the embodiment illustrated in FIGS. 1 to 5 and have the same spring characteristics.

The lower blade element 53 is straight in its relaxed position illustrated in FIG. 7, and has "V" shaped recesses 58 and 59 adjacent its free end identical in construction to the recesses 17 and 18 illustrated in FIG. 4, and also has a point 60 on the distal end thereof identical to cleaning point 24 illustrated in the FIGS. 1 to 5 embodiment.

The lower blade element is bent over 180 degrees forming integral clip 55. Clip 55 has an outwardly curved end 56 so the clip may be easily inserted over a suitable part of the fisherman's clothing and the tool easily carried about.

The upper blade element 52 has a flat portion 62 spot welded to the rear end of the lower blade element 53 and an arcuately curved main portion 64 with a free end 65 that has a 30 degree angular relationship with respect to a horizontal plane extending through the lower blade 53. Upper blade end 65 has a straight ground cutting edge 67 at its extreme end.

The fisherman's tool 50 operates in the same manner as the fisherman's tool 10 illustrated in FIGS. 1 to 5 and as the upper and lower blade elements 52 and 53 are squeezed together as shown in FIG. 8, the lower blade element 53 bends upwardly slightly and the lower blade element 52 bends downwardly slightly decreasing the interferring included angle between the upper and lower blades and improving the cutting action as the cutting edge 67 engages and slides on the upper surface of the end of the lower blade 53 across the line receiving recesses 58 and 49.

It is claimed:

1. A fisherman's tool for cutting line and cleaning hooks, comprising: a first generally flat spring member having a line receiving recess at one end thereof, a second generally flat spring member fixed to the first spring member at the other end thereof and extending generally parallel thereto and having a surface facing the first spring member, said second flat spring member having a curved end adjacent its free end with a cutting edge on the surface facing the first spring member, slidably engagable with the first spring member across the line receiving recess to sever line positioned in the recess when the first and second spring members are pressed together, said first and second spring members having an included angle of substantially less than 45 degrees adjacent the free end of the second spring member to assure smooth sliding contact of the cutting edge with the first spring member across the recess to provide a shearing action in severing the line, and a tapered point integrally formed at said one end of the first member with sharp side edges sufficiently narrow to fit in conventional hook eyes so they may be cleaned by rotating the point in the hook eye.

2. A fisherman's tool for cutting line and cleaning hooks, as defined in claim 1, wherein the first and second spring members are constructed from a single metal strip bent over on itself.

3. A fisherman's tool for cutting line and cleaning hooks, as defined in claim 1, including a third spring member connected to the first spring member defining a clip for attaching the tool to the fisherman's clothing.

4. A fisherman's tool for cutting line and cleaning hooks, as defined in claim 1, wherein there are two line receiving recesses on the opposite sides of the first member so either side of the tool can be used for line cutting.

5. A fisherman's tool for cutting line and cleaning hooks, as defined in claim 4, wherein the recesses are generally "V" shaped with forwardly converging side edges to hold the line prior to cutting.

6. A fisherman's tool for cutting line and cleaning hooks, as defined in claim 1, wherein the hook cleaner point has an inverted "V" shape with concave side cutting edges.

7. A fisherman's tool for cutting line or leaders, comprising; a first generally flat spring member having a line receiving recess at one end thereof, and a second generally flat spring member fixed to the first spring member at the other end thereof and extending generally parallel thereto and having a surface facing the first spring member said second flat spring member having a curved end adjacent its free end with a cutting edge on its surface facing the first spring member slidably engagable with the first spring member across the line receiving recess to sever line positioned in the recess when the first and second spring members are pressed together, said first and second spring members having an included angle of substantially less than 45 degrees adjacent the free end of the second spring member to assure smooth sliding contact of the cutting edge with the first spring member across the recess to provide a shearing action in severing the line.

8. A fisherman's tool for cutting line and cleaning hooks, as defined in claim 7, wherein the first and second members are integrally formed from a single piece of metal.

9. A fisherman's tool for cutting line and cleaning hooks, as defined in claim 7, wherein the first spring member is curved adjacent the recess therein in a direction away from the second spring member, said second spring member being curved toward the recess so the free ends of the first and second members form an angle of approximately 10 degrees with one another.

10. A fisherman's tool for cutting line and cleaning hooks, as defined in claim 7, including a narrow point on the end of the first member for cleaning hook eyes.

11. A fisherman's tool for cutting line or leaders, comprising; a first spring member having a curved free end with a recess for holding a line or leader therein and, a second spring member fixed to the other end of the first spring member having a first straight portion extending outwardly away from the first member, said second spring member having a second portion curved inwardly from the first portion toward the curved free end of the first member, said second portion being curved generally in the same direction as the curved end on the first member and having a surface facing the first spring member, said second portion having a straight cutting edge on its free end on the surface facing the first spring member and parallel to the plane of the first member so that when the first and second members are compressed together the second member's cutting edge will wipe forwardly on the curved free end of the first member across the recess severing line in the recess, said first and second spring members having an included angle of substantially less than 45 degrees adjacent the free end of the second spring member to assure smooth sliding contact of the cutting edge with the first spring member across the recess to provide a shearing action in severing the line.

12. A fisherman's tool for cutting line and cleaning hooks, as defined in claim 11, wherein the second portion of the second member and the curved end of the first member define an included angle of approximately 10 degrees.

13. A fisherman's tool for cutting line and cleaning hooks, as defined in claim 11, wherein there are two line receiving recesses on the opposite sides of the first member so either side of the tool can be used for line cutting.

14. A fisherman's tool for cutting line or leaders, comprising; a first spring member having a curved free end with a recess for holding a line or leader therein and, a second spring member formed integrally with and extending from the other end of the first spring member having a first straight portion extending outwardly away from the first member, said second spring member having a second portion curved inwardly from the first portion toward the curved free end of the first member and a surface facing the first spring member, said second portion being curved generally in the same direction as the curved end of the first member, and said second portion having a straight cutting edge on the free end thereof on the surface facing the first spring member and parallel to the plane of the first member so that when the first and second members are compressed together the second member's cutting edge will wipe forwardly on the curved free end of the first member across the recess severing the line in the recess, said first and second spring members having an included angle of substantially less than 45 degrees adjacent the free end of the second spring member to assure smooth sliding contact of the cutting edge with the first spring member across the recess to provide a shearing action in severing the line.

15. A fisherman's tool for cutting line or leaders, comprising; a first member having a free end with a recess for holding a line or leader therein and, a second spring member fixed to the other end of the spring member having a first straight portion extending outwardly away from the first member, said second spring member having a second portion curved inwardly from the first portion toward the free end of the first member and a surface facing the first spring member, and said second portion having a straight cutting edge on the free end thereof on the surface facing the first spring member and parallel to the plane of the first member so that when the first and second members are compressed together the second member's cutting edge will wipe forwardly on the free end of the first member across the recess severing line in the recess, said first and second spring members having an included angle of substantially less than 45 degrees adjacent the free end of the second spring member to assure smooth sliding contact of the cutting edge with the first spring member across the recess to provide a shearing action in severing the line.

16. A fisherman's tool for cutting line and cleaning fish hook eyes, comprising; a one-piece member constructed from flat spring steel bent over approximately in the middle forming first and second flexible portions with an included angle of approximately fifteen degrees, said first and second portions having ends curved in the same direction with the curved end on the second portion extending toward the curve end of the first portion and engagable and slidable therewith as the first and second portions are squeezed together, said curved end of the first portion having a "V" shaped recess in each side thereof for receiving and holding line positioned therein, said end of the second portion having a surface facing the first spring portion and having a cutting edge on the surface at the distal end thereof adapted to sever by shearing action line positioned in the recess, and an integral central point on the distal end of the first portion adjacent the recess for cleaning hook eyes, said point having concave sharpened side edges.

* * * * *